United States Patent [19]

Okamoto

[11] Patent Number: 4,480,992

[45] Date of Patent: Nov. 6, 1984

[54] METHOD OF HEATING A FURNACE

[75] Inventor: Kenji Okamoto, Hiroshima, Japan

[73] Assignee: Sanken Sangyo Kabushiki Kaisha, Hiroshima, Japan

[21] Appl. No.: 426,374

[22] Filed: Sep. 29, 1982

[30] Foreign Application Priority Data

Oct. 17, 1981 [JP] Japan ................................. 56-165959
Jul. 17, 1982 [JP] Japan ................................. 57-124818

[51] Int. Cl.³ .......................... F26B 9/12; F27D 7/00;
F27D 19/00; F27B 9/40
[52] U.S. Cl. ........................................ 432/18; 432/24;
432/37; 432/51
[58] Field of Search ...................... 432/18, 24, 36, 37,
432/51

[56] References Cited
U.S. PATENT DOCUMENTS

3,051,462 8/1962 Fennell ................................. 432/24

Primary Examiner—John J. Camby
Attorney, Agent, or Firm—Flynn, Thiel, Boutell & Tanis

[57] ABSTRACT

A heat-treatment furnace for thermally treating materials such as iron or steel products therein has a plurality of burners selectively actuable in different combinations at successive stages of a predetermined combustion control pattern or one of such patterns. At least one of the selected burners is alternately turned on and off during its operation in each stage. The combustion control pattern may be selected which corresponds to one of a plurality of temperature distribution patterns as sensed by temperature sensors located in the furnace at different positions. With the method of the invention, the furnace can be heated efficiently according to a predetermined optimum combustion pattern without consuming an excess amount of fuel and discharging unwanted exhaust pollutants.

14 Claims, 20 Drawing Figures

METHOD OF HEATING A FURNACE

BACKGROUND OF THE INVENTION

The present invention relates to a method of heating a furnace such as for thermally treating iron, steel or the like therein efficiently up to a uniform temperature in the furnace while reducing harmful pollutants in the exhaust gas emitted from the furnace.

There are known furnaces for heating a batch of materials such as iron or steel products therein. Such a batch heating furnace has burners for heating the material at a maximum rate during an initial stage in which a large quantity of exhaust gas circulates in the furnace. The initial heating state is followed by a gradual reduction in the amount of combustion by the burners. Uniformized furnace heating only requires the consumption of an amount of thermal energy which is 1/10 to 1/100 of the thermal energy consumed during the initial stage. This type of furnace heating with decreasing thermal energy has conventionally been carried out by a system in which both air and fuel as supplied are throttled at a constant air-fuel ratio. Although the prior system is of improved thermal efficiency, it is disadvantageous in that the material is not heated to a uniform temperature as localized high-temperature areas of the material are concentrated in the vicinity of the burners.

There is also known a constant-air combustion system in which the amount of air supplied upon maximum combustion remains fixed throughout the operation and fuel is supplied in a decreasing amount as the combustion progresses. This system however is poor in thermal efficiency during a uniform heating period.

Another system, which is known as a so-called impulse combustion system, has all of its burners turned on and off simultaneously for pulsed combustion. With the impulse combustion system, the burners remain turned off for a long period of time during the uniform heating stage and no gas circulates in the furnace while the burners are being inactivated. Therefore, the temperature in the furnace cannot be rendered uniform.

According to still another system, there are employed specially designed burners which are controlled by a combination of the constant-air combustion system and the constant-air-fuel-ratio combustion system. Such a combined system is disadvantageous in that it is complex in construction and has poor thermal efficiency when the fuel is combusted at a low rate.

SUMMARY OF THE INVENTION

It is an object of the present invention to provide a method of heating a furnace while eliminating the foregoing conventional difficulties.

Another object of the present invention is to provide a method of heating a furnace efficiently in uniformized temperature distribution without causing unneccesary excess fuel consumption and unwanted harmful exhaust pollutants.

According to the present invention, there is provided a method of heating a furnace having a plurality of spaced burners supported on longitudinal sidewalls and directed into a furnace chamber, the burners being capable of combusting fuel at a constant air-fuel ratio. The method comprises the steps of sensing temperatures in the furnace chamber at different locations therein to select one of a plurality of predetermined temperature distribution patterns, and actuating selected burners in different combinations at successive stages of one of a plurality of predetermined combustion control patterns which corresponds to said one of predetermined temperature distribution patterns. The selected burners are selectively turned on and off alternately and kept turned on at the successive stages. The temperatures in the furnace are sensed at front, central and rear positions in the furnace along a longitudinal axis thereof.

According to the present invention, there is also provided a method of heating a furnace having a plurality of spaced burners supported on longitudinal sidewalls, the burners on the sidewalls being directed into a furnace chamber and being capable of combusting fuel at a constant air-fuel ratio, the method comprising the steps of actuating selected burners in sequentially variable combinations at successive stages of a predetermined combustion pattern, and alternately turning on and off at least one of the selected burners in unit intervals of time in each of the successive stages.

According to the present invention, there is also provided a method of heating a furnace having a plurality of spaced burners supported on longitudinal sidewalls and a plurality of spaced burners supported on a ceiling, the burners on the sidewalls and ceiling being directed into a furnace chamber, and being capable of combusting fuel at a constant air-fuel ratio, the method comprising the steps of actuating selected burners in sequentially variable combinations at successive stages of a predetermined combustion pattern, and alternately turning on and off at least one of the selected burners in unit intervals of time in each of the successive stages. The burners on the sidewalls have a fuel combustion capability which is half that of the burners on the ceiling, and the burners on the ceiling remain deactivated in early successive stages.

The above and other objects, features and advantages of the present invention will become more apparent from the following description when taken in conjunction with the accompanying drawings in which preferred embodiments of the present invention are shown by way of illustrative example.

DETAILED DESCRIPTION

Figure 1:
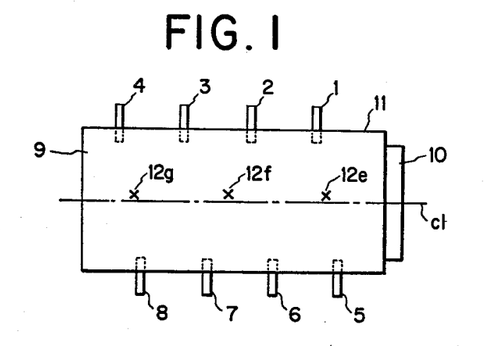
FIG. 1 is a schematic plan view of a heat-treatment furnace equipped with burners controllable by a method according to a first embodiment of the present invention.

FIG. 1 shows a heat-treatment furnace having a furnace chamber 9 with an inlet door 10 and a pair of opposite sidewalls 11, 11 extending longitudinally of the furnace. The heat-treatment furnace serves to thermally treat materials such as iron or steel products which are mounted on a truck and placed in the furnace chamber 9. A first group of four burners 1, 2, 3 and 4 spaced at certain intervals are mounted on one of the sidewalls 11 and a second group of four burners 5, 6, 7 and 8 spaced at certain intervals are mounted on the other sidewall 11, the burners 1 through 4 in the first group being staggered with respect to the burners 5 through 8 in the second group.

The burners 1 through 8 are in the form of high-speed jet burners for combusting fuel at a constant air-fuel ratio throughout initial and uniform heating stages to heat the furnace through high-speed convection. The high-speed jet burners completely burns the fuel therein and eject jets of combusted gas through burner tile outlets at a speed of about 200 m per second. The emitted jets of exhaust gas serve to stir a large quantity of exhaust gas in the furnace. The high-speed jet burners are suitable for use with large-size heat-treatment furnaces.

The furnace chamber 9 has therein three temperature sensors 12e, 12f and 12g disposed along a longitudinal center line cl of the furnace chamber 9 and located at spaced locations, that is, front, central and rear positions. The temperature sensor 12f is called a master sensor for acting as a reference in selecting heat-treatment programs. The temperature sensors 12e, 12g are called subsensors. Additional temperature sensors may be provided at positions other than the front, central and rear positions in which the sensors 12e, 12f and 12g are located.

Figure 2:
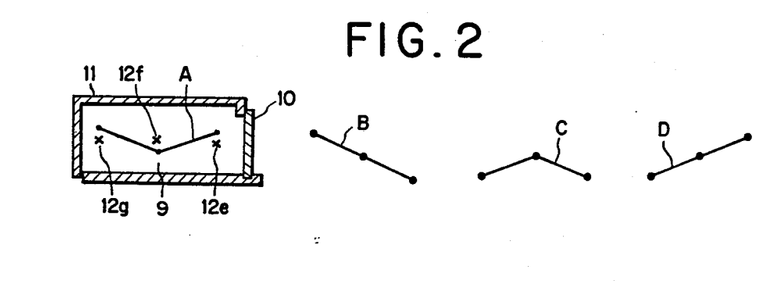
FIG. 2 is a diagram showing a plurality of different patterns of localized furnace temperatures.

FIG. 2 shows furnace chamber temperature patterns A, B, C and D which are established beforehand. The pattern A indicates that the temperature of the furnace chamber 9 is lowest at a central portion thereof and higher at front and rear portions thereof. According to the pattern B, the temperature of the furnace chamber 9 is lowest at the front portion and becomes progressively higher rectilinearly toward the rear portion of the furnace chamber 9. In the pattern C, the central portion of the furnace chamber 9 has a highest temperature and the front and rear portions thereof have lower temperatures. The pattern D indicates that the furnace chamber 9 has a highest temperature at the front portion and progressively higher temperatures rectilinearly toward the central and front portions. The temperature sensors 12e, 12f and 12g serve to determine whether the temperature distribution in the furnace chamber 9 is according to the pattern A, B, C or D.

Figure 3:
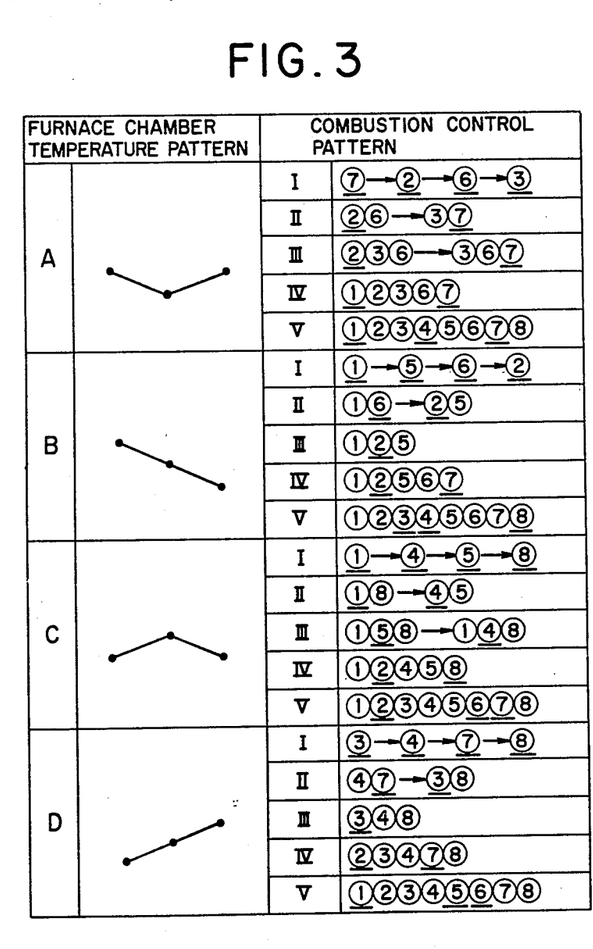
FIG. 3 is illustrative of the furnace temperature patterns and a plurality of varied combustion control patterns in which the furnace is heated dependent on the furnace temperature patterns.

Operation of the burners to govern the temperature in the furnace chamber 9 by combusting fuel is controlled by increasing or reducing the number of burners which are being activated. FIG. 3 is illustrative of control patterns each having five stages I through V by which the burners are selectively turned on and off to burn the fuel for the temperature patterns A through D.

The combustion control pattern for the temperature pattern A will be described. In FIG. 3, the circled reference numerals designate burners shown in FIG. 1, and those underscored are turned on and off and those not underscored are kept turned on while being energized. In the stage I, only a single burner is kept ignited at all times throughout one cycle by turning on the burners 7, 2, 6 and 3 alternately in the order indicated by the arrows. Such a cycle of operation is repeated as desired. In the stage II, two burners remain activated at all times by first getting the burners 2, 6 in operation and then the burners 3, 7 in operation. The stage III finds three burners actuated throughout; the burners 2, 3 and 6 are activated simultaneously at first, and then the burners 3, 6 and 7 are activated simultaneously. In the stage IV, the burners 1, 2, 3, 6 and 7 remain activated throughout. In the stage V, all of the burners 1 through 8 are ignited at the same time and kept activated throughout.

According to the combustion control pattern for the temperature pattern A, the combustion rate becomes progressively greater as the combustion progresses from the stages I to V. Since the central portion of the furnace chamber is at the lowest temperature in the temperature pattern A, the burners 2, 3, 6 and 7 are mainly actuated through the stages I through V to uniformize the temperature distribution in the furnace chamber. Unwanted localized excessive heating can be prevented by energizing different burners or burner combinations alternately in the stages I through III.

Likewise, the burners are selectively and simultaneously put in operation in the successively stages I through V according to different combustion control patterns to cope with the temperature patterns B, C and D.

The burners 1 through 8 can be controlled by a computer (not shown) to follow the stages I through V of the combustion control patterns in response to outputs from the temperature sensors 12e, 12f and 12g which are indicative of any one of the temperature patterns A, B, C and D. More specifically, the temperature distribution in the furnace chamber 9 is measured by the temperature sensors 12e, 12f and 12g to determine which temperature pattern A, B, C or D the furnace chamber 9 is subjected to. An optimum rate of combustion is also determined dependent on the kind and quantity of a material to be thermally treated in the furnace. Based on the above data, any one of the combustion control patterns having the stages I through V is selected to control the burners 1 through 8.

With the burner control method according to the first embodiment of the present invention, the burners 1 through 8 are automatically controlled for selective and sequential operation in a selected pattern optimum for the sensed temperature distribution pattern of the furnace chamber, so that the temperature in the furnace chamber can be uniformized reliably to meet the uniform-temperature requirements for the heat-treatment furnace. The burner control method of the invention is a labor saver as it is rendered unnecessary for the operator to manually throttle fuel and air supply to and deactivate the burners while observing the temperature within the furnace chamber. The burner control method is also an energy saver since the burners are controlled in the predetermined patterns best suited respectively for the temperature patterns as sensed of the furnace chamber. Use of the high-speed jet burners capable of combusting fuel at a constant air-fuel ratio or with a reduced amount of excess air results in a smaller amount of NOx discharged, thereby holding harmful public pollution to a minimum.

A method of heating a heat-treatment furnace according to a second embodiment will be described with reference to FIGS. 4 through 11.

Figure 4:
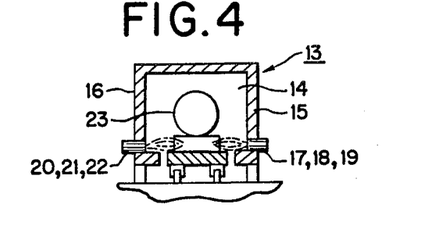
FIG. 4 is a vertical cross-sectional view of a furnace which can be heated by burners controllable by a method according to a second embodiment of the present invention.
Figure 5:
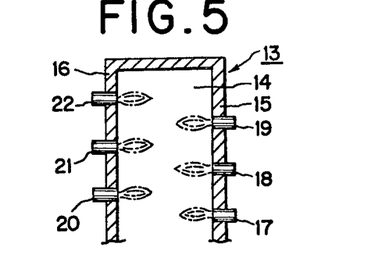
FIG. 5 is a horizontal cross-sectional view of the furnace shown in FIG. 4.

FIGS. 4 and 5 illustrate a heat-treatment furnace 13 having a furnace chamber 14 and a pair of opposite sidewalls 15, 16 supporting thereon first and second groups of spaced high-speed jet burners 17, 18, 19 and 20, 21, 22, respectively, which are staggered with respect to each other in the longitudinal direction of the furnace 13. The heat-treatment furnace 13 serves to thermally treat an object such as an iron or steel product 23 placed in the furnace chamber 14 as shown in FIG. 4.

The burners 17 through 22 can be controlled to remain turned on or be turned on and off alternately throughout their operation. While they are turned on, they combust a maximum amount of air and fuel at a constant air-fuel ratio, and while they are turned off, they eject no air and fuel at all. The burners that are turned on and off alternately may be turned on for a shorter period of time and turned off for a longer period of time to emit a smaller amount of thermal energy while they are in operation. Conversely, the burners may be turned on for a longer period of time and turned off for a shorter period of time to generate a larger amount of thermal energy during their operation. The burners 17 through 22 are selectively activated to control the rate of combustion stepwise in five different control stages I through V. Such selective burner control will be described with reference to FIGS. 6 through 10 in which the burners that are alternately turned on and off are indicated by the dotted lines and those kept turned on are indicated by the solid lines.

Figure 6:
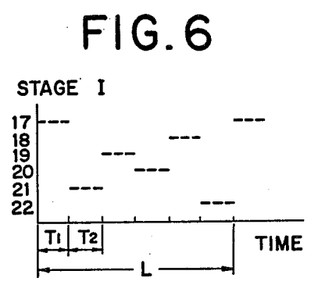
FIGS. 6 through 10 are graphs showing patterns in which the burners in the furnace of FIGS. 4 and 5 are actuated at first through fifth control stages.

As shown in FIG. 6, only one burner is in operation throughout the control stage I by alternately activating the burners 17 through 22. More specifically, the burner 17 is first actuated during an interval of time $T_1$, and then the burner 17 is deactivated and the burner 21 is put into operation during a next interval of time $T_2$. Thereafter, the burners 19, 20, 18 and 22 are alternately actuated. One cycle of operation is thus completed in a unit period of time L and will be repeated for a desired length of time. During the stage I, an amount of thermal energy generated ranges from 0 to 1/6 of the maximum rate of combustion.

Figure 7:
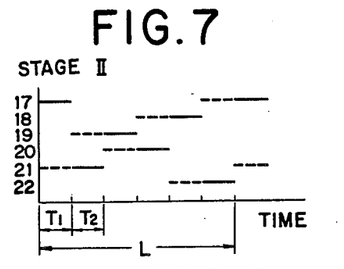

In the stage II, two burners are in operation at all times. As shown in FIG. 7, the burners 17 and 21 are activated with the burner 17 kept turned on and the burner 21 turned on and off alternately during a first interval of time $T_1$. Then, the burner 19 is alternately turned on and off and the burner 21 is kept turned on during a next interval of time $T_2$. Likewise, successively selected two burners are brought into operation in one cycle of operation during a period of time L. The stage II discharges an amount of thermal energy in the range of from 1/6 to 2/6 of the maximum combustion rate.

Figure 8:
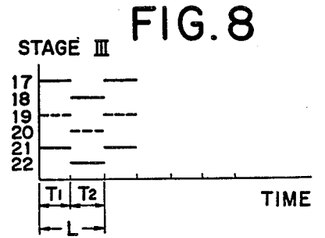

A combination of three burners 17, 19 and 21 is activated in an interval of time $T_1$ and another combination of three burners 18, 20 and 22 is activated in a following interval of time $T_2$ during the stage III, the intervals of $T_1$, $T_2$. constituting a period of time L for one cycle of operation. In the stage III, two out of the selected three burners are kept turned on and the other one is alternately turned on and off.

Figure 9:
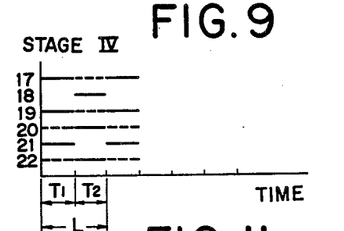

In the stage IV, one cycle of operation has a period of time L which is composed of two unit intervals of time $T_1$, $T_2$ As shown in FIG. 9, during each unit interval of time, three burners are kept turned on and two burners are alternately turned on and off. The amount of thermal energy emitted by the selected burners ranges from 3/6 to 4/6 of the maximum rate of combustion.

Figure 10:
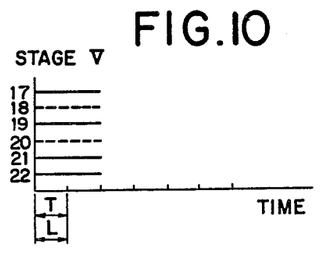

As illustrated in FIG. 10, the burners 17, 19, 21 and 22 are kept turned on and the burners 18 and 20 are alternately turned on and off in the stage V during an interval of time T which is equal to a period of time L for one cycle of operation. The burners can give off an amount of thermal energy ranging from 4/6 to 6/6 of the maximum combustion rate. The stage V may be divided into two substages for emitting 4/6 to 5/6 thermal energy and 5/6 to 6/6 thermal energy, respectively.

Figure 11:
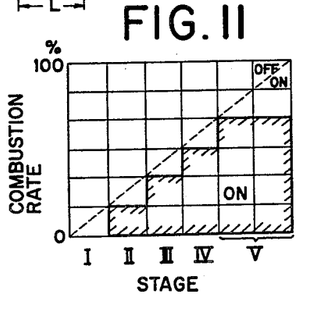
FIG. 11 is a graph illustrative of a relationship between the rate of combustion and the control stages.

FIG. 11 is illustrative of a relationship between the stages I through V and the combustion rate. The hatched area indicates the combustion by the burners which are kept turned on during their operation, and the area defined between the hatched area and the dotted line is indicative of the combustion by the burners which are alternately turned on and off.

Figure 12:
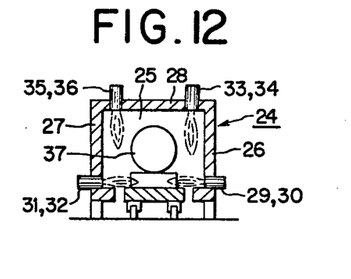
FIG. 12 is a vertical cross-sectional view of a furnace which can be heated by burners controllable by a method according to a third embodiment of the present invention.
Figure 13:
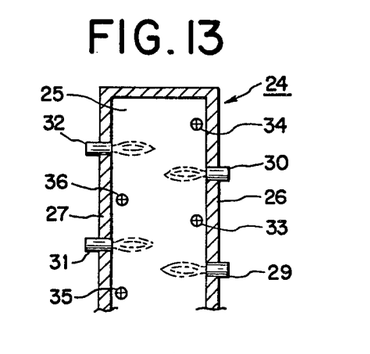
FIG. 13 is a horizontal cross-sectional view of the furnace shown in FIG. 12.

FIGS. 12 through 20 show a method of heating a heat-treatment furnace according to a third embodiment of the present invention. FIGS. 12 and 13 illustrate a heat-treatment furnace 24 having a furnace chamber 25, a pair of opposite sidewalls 26, 27, and a ceiling 28. First and second groups of spaced high-speed jet burners 29, 30 and 31, 32 are supported respectively, on the sidewalls 26, 27, and third and fourth groups of spaced high-speed jet burners 33, 34 and 35, 36 are supported on the ceiling 28, the burners 33, 34 being located adjacent to the sidewall 26 and the burners 35, 36 adjacent to the side wall 27. The burners 29 through 36 are staggered with respect to each other in the longitudinal direction of the furnace 24. The heat-treatment furnace 24 serves to thermally treat an object such as an iron or steel product 37 placed in the furnace chamber 25 as shown in FIG. 12.

The burners 29 through 32 mounted on the sidewalls 26, 27 have a fuel combustion capacity which is half that of the burners 33 through 36 mounted on the ceiling 28. The burners 29 through 36 can be controlled to remain turned on or be turned on and off alternately throughout their operation. While they are turned on, they combust a maximum amount of air and fuel at a constant air-fuel ratio, and while they are turned off, they eject no air and fuel at all. The burners 29 through 36 are selectively activated to control the rate of combustion stepwise in different six control stages I through VI. Such selective burner control will be described with reference to FIGS. 14 through 19 in which the burners that are alternately turned on and off are indicated by the dotted lines and those kept turned on are indicated by the solid lines.

Figure 14:
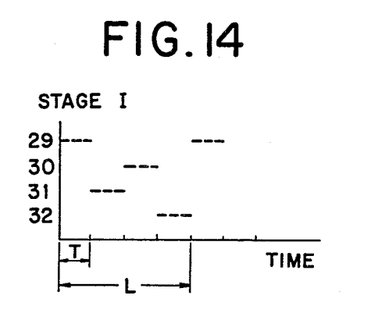
FIGS. 14 through 19 are graphs showing patterns in which the burners in the furnace of FIGS. 12 and 13 are actuated at first through fifth control stages.

In the stage I, the burners 29 through 32 on the sidewalls are alternately activated in the order named each during a unit interval of time T for a period of time L which is composed of four unit interval of time. During operation, the burners 29 through 32 are alternately turned on and off. The burners 29 through 32 generate an amount of thermal energy which ranges 0 to 1/12 of the maximum rate of combustion in the stage I.

Figure 15:
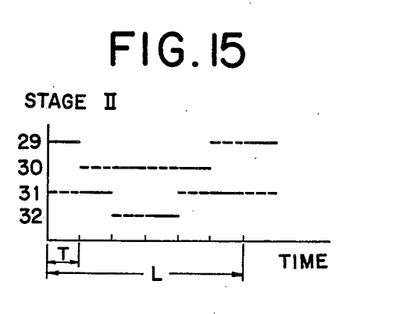

FIG. 15 shows the stage II in which two out of the burners 29 through 32 on the sidewalls 26, 27 are always in operation during a period of time L which has six unit intervals of time T. One of the selected two burners is kept turned on and the other is alternately turned on and off during their operation. The burners produce an amount of thermal energy which ranges from 1/12 to 2/12 of the maximum combustion rate in the stage II.

Figure 16:
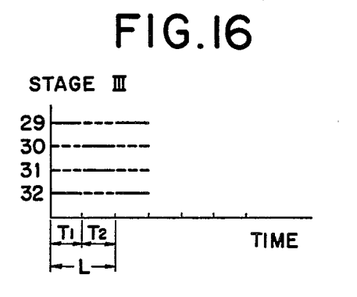

As shown in FIG. 16, all of the burners 29 through 32 are actuated in the stage III. The burners 29, 32 are kept turned on and the burners 30, 31 are alternately turned on and off in a first unit interval of time $T_1$. Then, the burners 30, 31 are kept turned on and the burners 29, 32 are alternately turned on and off in a second unit interval of time $T_2$. One cycle of operation has a period of time L composed of the unit intervals of time $T_1$, $T_2$. In the stage III, the amount of thermal energy generated is in the range of from 2/12 to 4/12 of the maximum rate of combustion.

Figure 17:
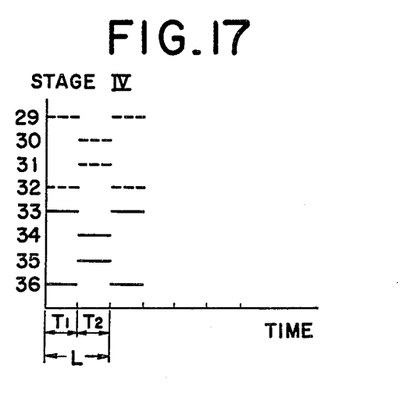

In the stage IV, as shown in FIG. 17, the burners 29, 32 on the sidewalls 26, 27, respectively, are alternately turned on and off and the burners 33, 36 on the ceiling 28 are kept turned on during a first unit interval of time $T_1$. During a next unit interval of time $T_2$, the burners 30, 31 on the sidewalls 26, 27, respectively, are alternately turned on and off and the burners 34, 35 on the ceiling 28 are kept turned on. One cycle of operation is thus completed in a period of time L which is composed of the intervals of time $T_1$, $T_2$. The stage IV gives off an amount of thermal energy in the range of from 4/12 to 6/12 of the maximum combustion rate.

Figure 18:
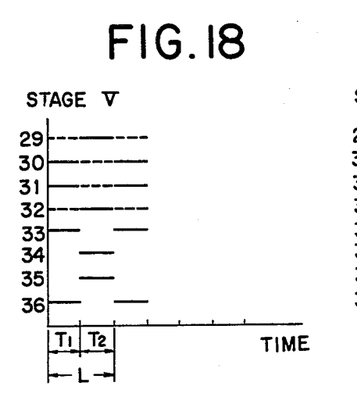

FIG. 18 illustrates the stage V in which the burners 30, 31, 33 and 36 are kept turned on and the burners 29, 32 are turned on and off during a first unit interval of time $T_1$ Then, the burners 29, 32, 34 and 35 are kept turned on and the burners 30, 31 are alternately turned on and off during a second unit interval of time $T_2$. One cycle of operation is thus finished which has a period of time L composed of the unit intervals of time $T_1$, $T_2$. The amount of thermal energy ranging from 6/12 to 8/12 of the maximum combustion rate is produced in the stage V.

Figure 19:
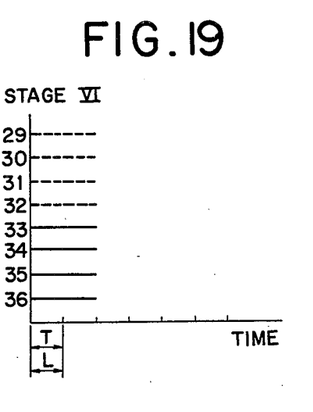

In the stage VI, the burners 29 through 32 on the sidewalls 26, 27 are turned on and off and the burners 33 through 36 on the ceiling 28 are kept turned on during a unit interval of time T which is equal to a period of time L for one cycle of operation, as illustrated in FIG. 19. The burners genrate an amount of thermal energy which ranges from 8/12 to 12/12 of the maximum rate of combustion during the stage VI.

Figure 20:
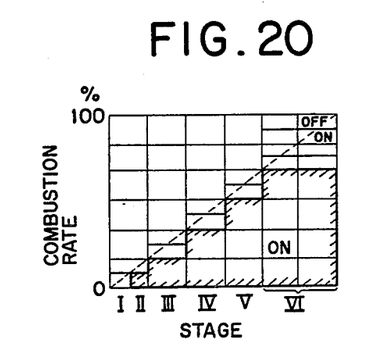
FIG. 20 is a graph illustrative of a relationship between the rate of combustion and the control stages.

FIG. 20 shows a relationship between the stages I through VI and the combustion rate. The burners are continuously turned on in a hatched area and alternately turned on and off in an area defined between the hatched area and solid lines.

With the burner control methods according to the second and third embodiments, the burners are activated, continuously or alternately on and off, in predetermined periodically variable combinations at different control stages so that the furnace chamber will be heated uniformly without causing localized excess heating for thereby reducing unneccesary energy consumption and harmful exhaust pollutants, particularly NOx.

Although certain preferred embodiments have been shown and described, it should be understood that many changes and modifications may be made therein without departing from the scope of the appended claims.

What is claimed is:

1. A method of uniformly heating a furnace chamber of a heat-treatment furnace, said furnace chamber having a pair of opposite sidewalls between which a workpiece to be thermally treated is positioned, a plurality of spaced-apart burners supported on said opposite sidewalls and directed into the furnace chamber, and a plurality of temperature sensors disposed in said furnace chamber at different locations along an axis of said furnace chamber, comprising the steps of:
   (a) determining a set of different temperature distribution patterns indicative of uneven temperature distribution along said axis of said furnace chamber;
   (b) sensing temperature at said different locations in said furnace chamber with said sensors to determine which one of said predetermined temperature distribution patterns exists within said furnace chamber; and
   (c) actuating said burners in different sequential combinations of one or more burners in successive stages according to one of a plurality of predetermined combustion control patterns, said combustion control pattern being selected according to said determined temperature distribution pattern to substantially eliminate the uneven temperature distribution represented by said determined temperature distribution pattern to thereby uniformly heat said furnace chamber along said axis.

2. A method according to claim 1, wherein each of said successive stages comprises a predetermined sequence of one or more unit time intervals, such that a different burner or combination of said burners is actuated during each successive unit time interval.

3. A method according to claim 2, wherein at least some of said burners are actuated by being turned alternately on and off during said unit time intervals, and at least some of said burners are actuated by being turned on continuously during said unit time intervals.

4. A method according to claim 2, wherein the number of said burners actuated during each unit time interval of each successive stage sequentially increases for each successive stage, thereby incrementally increasing the rate of combustion in said furnace chamber during said succesive stages, and at least one burner is actuated by being alternately turned on and off during each one of said unit time intervals of each one of said successive stages.

5. A method according to claim 4, wherein the same number of said burners are actuated during each successive unit time interval of each of said successive stages.

6. A method according to claim 4, wherein said furnace further comprises a ceiling spanning said opposite sidewalls, and a plurality of spaced-apart additional burners are supported on said ceiling and are directed downwardly into said furnace chamber therefrom, said additional burners being actuated in said step (c) in said successive stages together with said burners supported on said opposite sidewalls.

7. A method according to claim 6, wherein said burners supported on said sidewalls have a fuel combustion capability of said additional burners on said ceiling, and said additional burners remain deactivated during the first half of said successive stages of said selected combustion control pattern.

8. A method according to claim 1, wherein said axis extends longitudinally of said furnace chamber parallel to said opposite sidewalls.

9. A method of uniformly heating a furnace chamber of a heat-treatment furnace, said furnace having a pair of opposite sidewalls between which a workpiece to be thermally treated is positioned, and a plurality of spaced-apart burners supported on opposite sidewalls and directed into the furnace chamber, comprising the step of:

actuating said burners in different sequential combinations of one or more burners in successive stages according to a predetermined combustion pattern such that the number of said burners actuated during each unit time interval of each stage increases for each successive stage, thereby incrementally increasing the rate of combustion in said furnace chamber during said successive stages, and at least one burner is actuated by being alternately turned on and off during each one of said unit time intervals of each of said successive stages.

10. A method according to claim 9, wherein said furnace further comprises a ceiling spanning said opposite sidewalls, and a plurality of spaced-apart additional burners are supported on said ceiling and are directed downwardly into said furnace chamber therefrom, said additional burners being actuated in said successive stages together with said burners supported on said opposite sidewalls.

11. A method according to claim 10, wherein said burners supported on said sidewalls have a fuel combustion capability which is approximately half the fuel combustion capability of said additional burners on said ceiling, and said additional burners remain deactivated during the first half of said successive stages of said combustion pattern.

12. A method for uniformly heating a furnace chamber of a heat-treatment furnace, which furnace chamber comprises a pair of opposite sidewalls between which a workpiece to be thermally treated is positioned, said sidewalls having a plurality of spaced-apart burners supported thereon, said burners being directed into said furnace chamber, and a plurality of temperature sensores are disposed in spaced-apart positions within said furnace chamber, comprising the steps of:

(a) determining a set of different temperature distribution patterns indicative of an uneven temperature distribution within said furnace chamber along said axis, said temperature distribution patterns each comprising a set of temperature readings corresponding to said sensor locations, each of said temperature readings being defined as either higher, lower or the same as each of the others of said set of temperature readings, such that each of said temperature distribution patterns differs from other temperature distribution patterns by at least one temperature reading at a corresponding sensor location;

(b) sensing temperatures at said different locations in said furnace chamber with said sensors to determine which of said predetermined temperature distribution patterns exists within said furnace chamber;

(c) actuating one or more of said burners in each of a plurality of unit time intervals, said unit time intervals in succession comprising a heating stage, such that a different burner or combination of burners is actuated during each of said unit time intervals, and then actuating said burners in further successive stages each comprising a succession of said unit time intervals according to one of a plurality of predetermined combustion control patterns, said combustion control pattern being determined by the temperature distribution pattern determined by said sensors, said successive stages being effective to reduce the eneven temperature distribution within said furnace indicated by said temperature distribution pattern; and (d) repeating the foregoing steps (b) and (c) as necessary to maintain uniform heating along said axis within said furnace chamber.

13. A method as claimed in claim 12, wherein the number of said burners actuated during each of said successive unit time intervals is the same for all of the unit time intervals of each stage, and the number of said burners actuated in each of said successive stages progressively increases.

14. A method as claimed in claim 13, wherein said temperature sensors are disposed along a longitudinal axis of said furnace chamber.

* * * * *

UNITED STATES PATENT AND TRADEMARK OFFICE
CERTIFICATE OF CORRECTION

PATENT NO. : 4,480,992
DATED : November 6, 1984
INVENTOR(S) : Kenji Okamoto

It is certified that error appears in the above-identified patent and that said Letters Patent is hereby corrected as shown below:

Column 8, line 60; after "capability" insert --which is approximately half the fuel combustion capability--.

Signed and Sealed this

Thirteenth Day of August 1985

[SEAL]

Attest:

DONALD J. QUIGG

Attesting Officer  Acting Commissioner of Patents and Trademarks